United States Patent
Gupta et al.

(10) Patent No.: US 12,483,438 B2
(45) Date of Patent: Nov. 25, 2025

(54) VEHICULAR MULTIPLEX BUS SYSTEM WITH BACKUP POWERLINE COMMUNICATION

(71) Applicant: FORD GLOBAL TECHNOLOGIES, LLC, Dearborn, MI (US)

(72) Inventors: Ajeya Gupta, Canton, MI (US); Haysam M. Kadry, Dearborn Heights, MI (US)

(*) Notice: Subject to any disclaimer, the term of this patent is extended or adjusted under 35 U.S.C. 154(b) by 363 days.

(21) Appl. No.: 18/331,373

(22) Filed: Jun. 8, 2023

(65) Prior Publication Data
US 2024/0414022 A1    Dec. 12, 2024

(51) Int. Cl.
H04L 12/40 (2006.01)
H03K 17/687 (2006.01)
H04L 41/0668 (2022.01)

(52) U.S. Cl.
CPC ... *H04L 12/40032* (2013.01); *H03K 17/6871* (2013.01); *H04L 12/40045* (2013.01); *H04L 41/0668* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 9,614,587 B2 | 4/2017 | Burk | |
| 9,871,669 B2 | 1/2018 | Logvinov et al. | |
| 2003/0043750 A1 | 3/2003 | Remboski et al. | |
| 2008/0069565 A1* | 3/2008 | Takahara | H04L 7/02 398/79 |
| 2013/0346821 A1* | 12/2013 | Chin | H04L 1/1809 714/748 |
| 2021/0296771 A1* | 9/2021 | Sano | H04B 3/52 |

FOREIGN PATENT DOCUMENTS

| | | |
|---|---|---|
| CN | 106302064 A | 1/2017 |
| CN | 106656570 A | 5/2017 |
| EP | 3866406 B1 | 8/2021 |

* cited by examiner

*Primary Examiner* — Angela Nguyen
(74) *Attorney, Agent, or Firm* — Frank Lollo; Eversheds Sutherland (US) LLP

(57) ABSTRACT

Multiplex communication in a vehicle is provided by a multiplex bus using complementary signals, such as a CAN bus. Bus redundancy for providing a backup communication channel in the event of a fault on the primary multiplex bus is achieved using power line communications (e.g., sending data over the already available DC power line). The need for additional circuitry is minimized by preserving the same message protocols (e.g., framing), because only signal conversion, filtering, and switching functions are required in order to divert messages via the power line.

18 Claims, 4 Drawing Sheets

VEHICULAR MULTIPLEX BUS SYSTEM WITH BACKUP POWERLINE COMMUNICATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to multiplex communication between electronic modules in a transportation vehicle, and, more specifically, to providing a backup communication channel in the event of a fault in a primary communication bus.

Serial multiplex communication between electronic modules disposed within a vehicle has been widely adopted. For example, the Controller Area Network (CAN) is a frequently used communications protocol which efficiently supports distributed real-time control with a high level of reliability. Interconnected modules have included engine control units, infotainment modules, navigation components, sensor units (e.g., cameras, radars, ultrasonics), antilock braking systems, electric power steering systems, and other systems using a CAN bus with bit rates up to 1 Mbit/s. The use of multiplex systems may reduce the size of the wiring harness while improving communication speed and flexibility.

When certain critical data is intended to be communicated using a multiplex bus, it may be necessary to undertake enhancements that help assure that important messages can be sent and received even in the presence of abnormalities. Known enhancements have included bus redundancies using added physical components and/or software with associated financial outlays.

SUMMARY OF THE INVENTION

In one aspect of the invention, an electronic component or module in a vehicle comprises a bus transceiver having a pair of transceiver output terminals adapted to be coupled to a multi-wire multiplex bus, wherein the multiplex bus transmits multiplex messages in the vehicle as complementary signals. A DC power input terminal is adapted to be coupled to a power line supplying DC electrical power to a plurality of electronic modules in the vehicle. A subtractor generates a single-ended difference signal according to a voltage difference between the pair of transceiver output terminals. A balanced signal generator has a single input adapted to receive an alternating component of a voltage at the power input terminal. The balanced signal generator has a pair of balanced outputs providing a differential signal to the transceiver output terminals according to a remote difference signal transmitted to the power line by one of the plurality of electronic modules. A first switch selectably couples the single-ended difference signal from the subtractor to the power input terminal when in a conductive state. A second switch selectably couples the single input of the balanced signal generator to the power input terminal when in a conductive state. A controller is configured to 1) detect a fault associated with the multiplex bus, 2) switch the first and second switches into the conductive states when the fault is detected, and 3) otherwise switch the first and second switches out of the conductive states. Thus, when the fault is detected then the multiplex messages are transmitted on the power line with an unaltered message frame.

DETAILED DESCRIPTION OF PREFERRED EMBODIMENTS

A typical CAN network has multiple nodes in a stub-based/daisy chain-based topology. A twisted pair of wires forms the CAN bus which interconnects bus transceivers in the nodes. At the same time, each node derives its power from a power line (e.g., extending from a power distribution box) carrying a DC supply voltage (e.g., 12 VDC).

The present invention employs primary communications via a multiplex bus, such as a CAN bus or other multi-wire bus which sends messages using complementary (i.e., differential) signals. Bus redundancy for providing a backup communication channel in the event of a fault on the primary multiplex bus is achieved using power line communications (e.g., sending data over the already available DC power line). The need for additional circuitry is minimized by preserving the same message protocols (e.g., framing), because the invention only requires signal conversion, filtering, and switching functions in order to divert messages via the power line.

Figure 1:
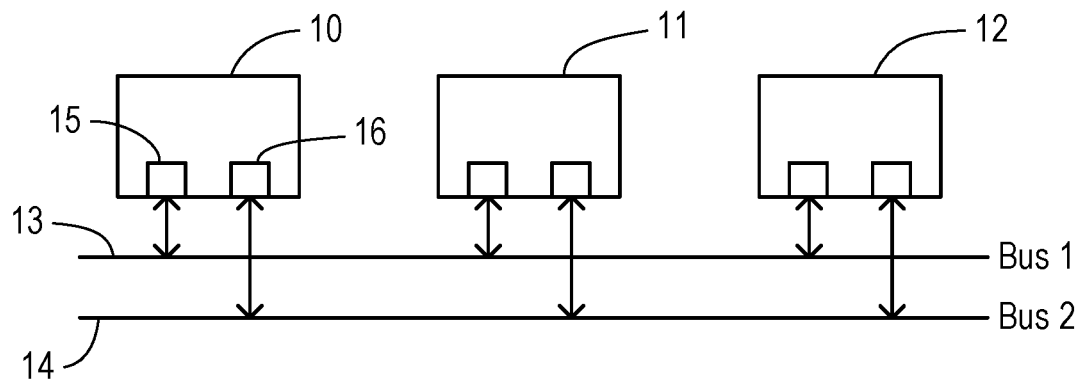
FIG. 1 is a schematic diagram showing a known multiplex communication bus system employing redundant buses.

Referring to FIG. 1, a plurality of electronic modules 10, 11, and 12 are interconnected by separate multiplex buses 13 and 14, either of which may be utilized to convey multiplex messages between respective modules. In order to provide full redundancy, first bus 13 and second bus 14 may utilize independent and distinct bus hardware. For example, module 10 includes separate bus transceivers 15 and 16 for communicating over first bus 13 and second bus 14, respectively. Thus, if a problem arises using one of the buses, then multiplex communication can be immediately diverted through the remaining bus.

Figure 2:
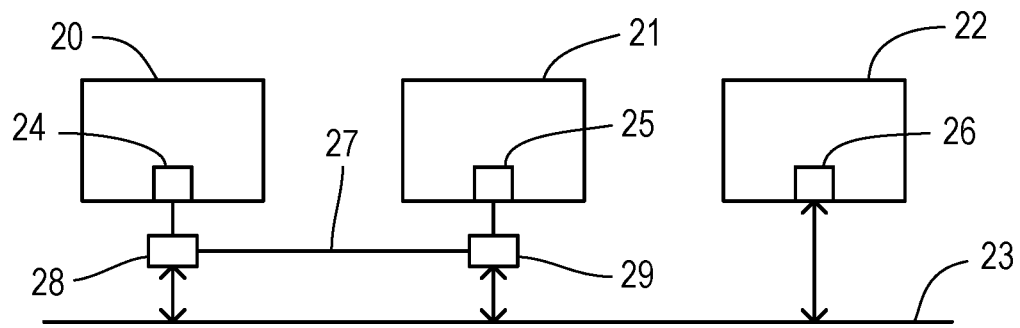
FIG. 2 is a schematic diagram showing a known multiplex communication bus system employing a backup communication link to a main bus.

FIG. 2 shows another known practice wherein a plurality of modules 20, 21, and 22 primarily communicate via a multiplex bus 23 using bus transceivers 24, 25, and 26. Partial redundancy is obtained by also interconnecting modules 20 and 21 via an alternate bus 27. A signal diverter 28 is connected to module 20 and a signal diverter 29 is connected to module 21. Signal diverters 28 and 29 normally allow the flow of multiplex messages between bus 23 and modules 20 and 21 respectively. But if they detect a fault associated with bus 23, then diverters 28 and 29 instead route messages via bus 27. While the arrangements in FIGS. 1 and 2 achieve redundancy and increase the likelihood of critical data messages being receiving at their intended destinations, significant amounts of additional circuitry and programming are necessitated.

Figure 3:
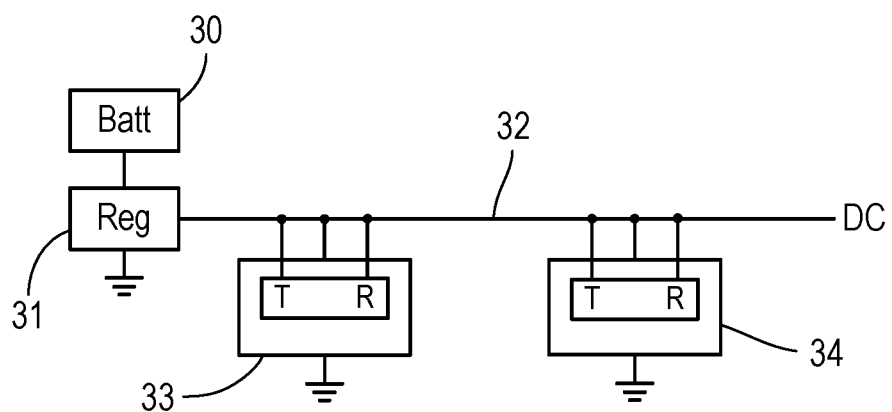
FIG. 3 is a schematic diagram showing a known power line communication system.

FIG. 3 shows a known type of power line communication system wherein a battery 30 and regulator 31 distribute power over a power line 32. A pair of modules 33 and 34 received a supply voltage via power line 32 while also communicating serial messages between them using a pair of transmitters T and a pair of receivers R. The power line communication system of FIG. 3 may have disadvantages (compared to FIGS. 1 and 2) of lowered robustness and reduced reliability because communication signals are single-ended (i.e., complementary or differential signals cannot be employed) and because communication speeds may be reduced.

Figure 4:
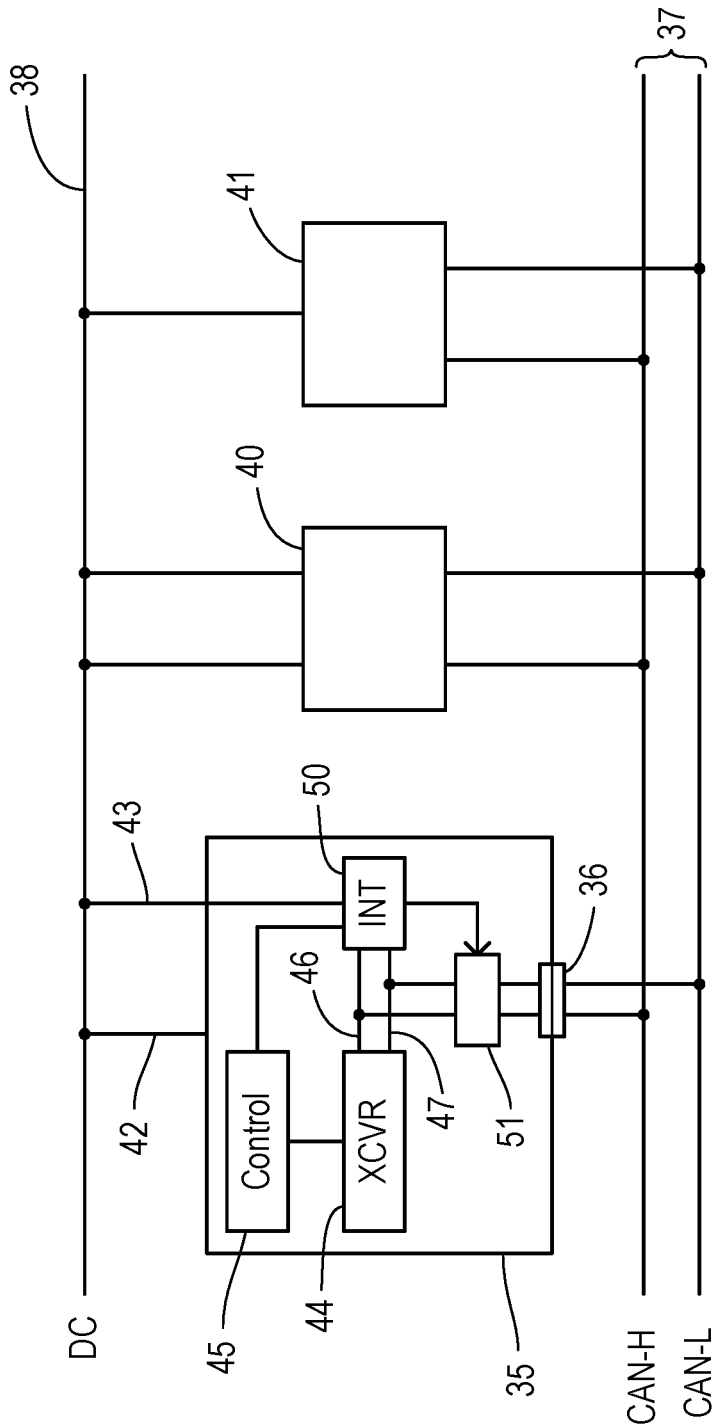
FIG. 4 is a schematic, block diagram showing an embodiment of the present invention.

FIG. 4 shows an embodiment of the invention wherein an electronic component or module 35 is connected via a connector 36 to a CAN multiplex bus 37 which includes a twisted wire pairs of wires labeled CAN-H and CAN-L. A DC power line 38 supplies DC electrical power to module 35 and to modules 40 and 41, each of which includes the same multiplex functionality as shown for module 35.

Module 35 receives and utilizes DC power via a wired connection 42. A wired connection 43 between power line 38 and module 35 is used to carry multiplex messages in the event that a fault (or potential fault) is detected in the wires of bus 37 which could impact CAN messages being transmitted between modules 35, 40, and 41. In module 34, a bus transceiver 44 works together with a CAN controller 45 in a conventional manner. Bus transceiver 44 has output terminals 46 and 47 for transmitting or receiving complementary signals following a CAN protocol. Output terminals 46 and 47 are connected to an interface circuit 50 and to and isolator circuit 51. Isolator circuit 51 is normally in a non-isolating state which allows CAN bus messages to flow between bus 37 and bus transceiver 44. Bus transceiver 44 and bus controller 45 may include conventional functionality for identifying instances when a fault or abnormality is present on bus 37, such as an open circuit or short-circuit. When controller 45 detects the presence of a fault, it provides a signal to interface circuit 50 which automatically reconfigures to a state wherein 1) it transmits CAN messages between bus transceiver 44 and power line 38 and 2) it sends a signal to isolator 51 on a general purpose input/output (GPIO) line 57 in order to block signals to or from multiplex bus 37. Modules 40 and 41 may simultaneously conduct the same functions of detecting a multiplex bus fault and to divert multiplex communication onto powerline 38.

Figure 5:
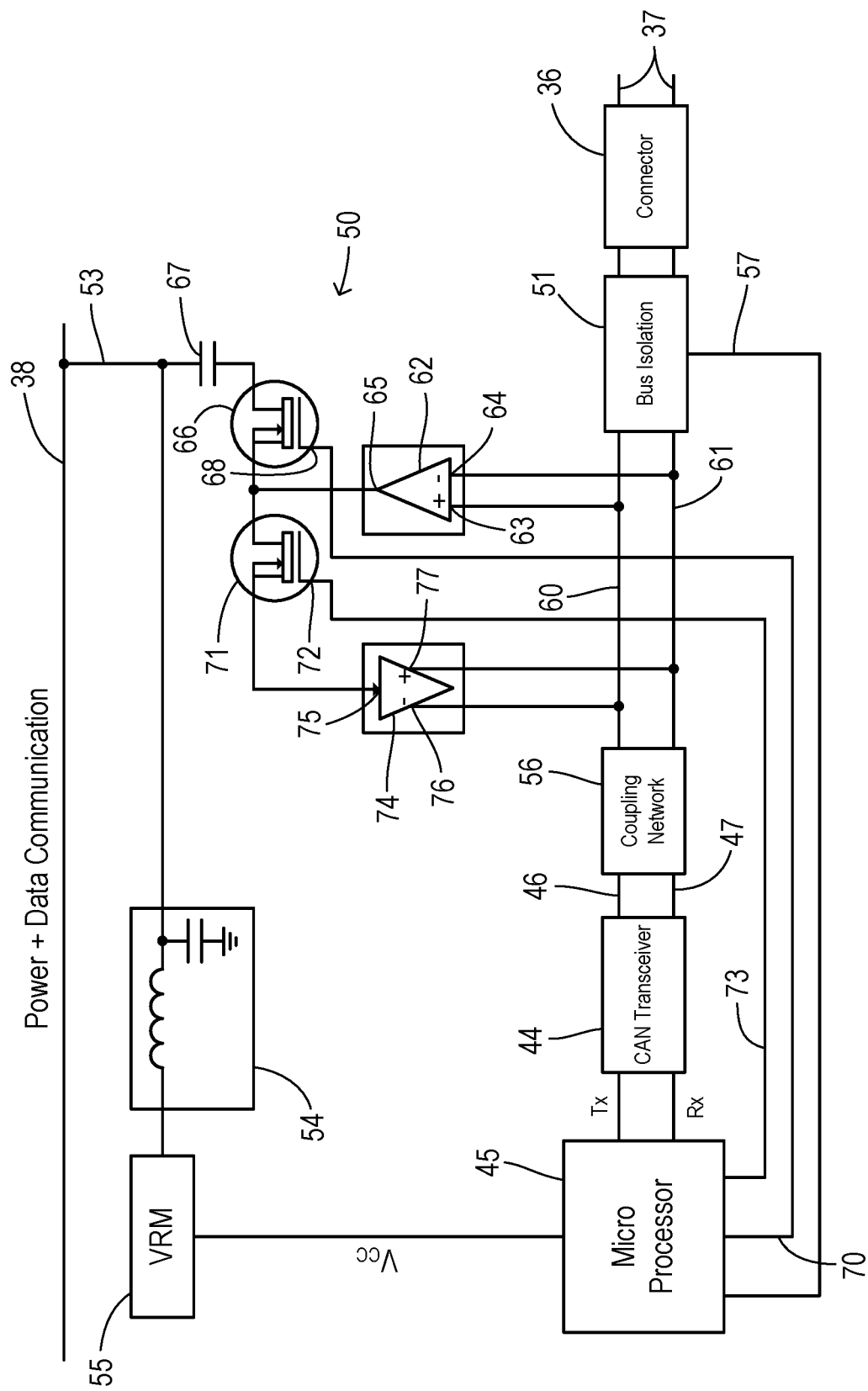
FIG. 5 is a schematic, block diagram showing an embodiment of an electronic module configured to execute an embodiment of the invention.

FIG. 5 shows module 35 in greater detail. An input terminal 53 conducts 12 volt DC power from power line 38 through a smoothing filter 54 to a voltage regulator module (VRM) 55. A regulated DC output (e.g., +5 VDC) is supplied to internal components including a microprocessor/controller 45.

CAN messages to be transmitted to another module are provided by controller 45 to transceiver 44 via a transmit line Tx. CAN messages from other modules are received transceiver 44 and to controller 45 for decoding via a receive line Rx. Output terminals 46 and 47 of transceiver 44 are connected to a coupling network 56 to provide a proper bus termination which may typically include filtering for electrostatic discharge and electromagnetic interference (e.g., using filtering capacitors). A pair of junctions 60 and 61 between coupling network 56 and bus isolation circuit 51 convey CAN communication signals according to a selected protocol (e.g., CAN-FD). When bus isolation circuit 51 is in a conductive state then CAN communication occurs normally over a multiplex bus 37. In the event that controller 45 or transceiver 44 detect a fault associated with multiplex bus 37 (e.g., an open circuit to one of the wires, a short between the bus wires, or a short between one of the wires and either ground the supply voltage), then bus isolation circuit 51 is switched to an isolating (nonconductive) condition such that transceiver 44 is isolated from bus 37. In the isolated condition, interface circuit 50 is operated to convey messages to or from power line 38, after converting the signals into single-ended signals suitable for conveyance over a single conductor which is referenced to ground. For sending CAN messages, junctions 60 and 61 having the complementary signals adapted for normal CAN transmission are couples to a noninverting input 63 and an inverting input 64 of a subtractor op amp 62. An output 65 of subtractor op amp 62 provides a single-ended difference signal according to the voltage difference between transceiver output terminals 46 and 47. Output 65 is connected to one terminal of a FET 66 acting as a switch to selectably couple the single-ended difference signal from subtractor op amp 62 to power input terminal 53 through an AC coupling capacitor 67 when in a conductive state. FET 66 has a gate terminal 68 coupled to controller 45 via GPIO line 70. Controller 45 provides a gate drive signal over line 70 such that FET 66 is normally in a nonconductive state. When controller 45 detects a fault associated with multiplex bus 37 then it inverts the gate drive signal to switch FET 66 into the conductive state. Consequently, the intended CAN message is coupled to power line 38 and can be received by other modules. Since the CAN message is only converted to a single-ended difference signal it is transmitted on the power line with an unaltered message frame. Therefore, no additional circuitry or software are introduced with respect to forming the messages. Likewise, the single-ended difference signal can be converted back to a complementary signal at the receiving node(s) so that the message can be decoded using the existing CAN transceiver(s).

For receiving CAN messages, an AC voltage from power line 38 is received at power input terminal 53 and coupled via capacitor 67 and FET 66 to a second FET 71. FET 71 has a gate terminal 72 connected to GPIO line 73 to receive a gate drive signal that places FET 71 in a conductive state during a fault condition. When FET 71 is turned on, the AC signal from power input terminal 53 is coupled to an input 75 of a balanced signal generator 74. Generator 74 is comprised of an op amp which is configured as a single-input, balanced output device which takes the input voltage and splits it into two outputs 76 and 77 which drive junctions 60 and 61 to reproduce a normal CAN message frame as received from a remote electronic module over power line 38.

Although controller 45 is shown with GPIO lines 57, 70, and 74, a preferred embodiment of the invention may utilize a single GPIO line generating 1) a first output level when no fault is detected, wherein the first output level turns off FETs 66 and 71 and turns on isolator 51, and 2) a second output level during a fault which turns on FETs 66 and 71 and turns off isolator 51. During an inactive state when no fault is being detected, FET 66 prevents converted CAN signals from coupling to power line 38 and FET 71 prevents any output signals from subtractor op amp 62 from being processed by balanced signal generator 74. During an active state when a fault is detected and FET 71 is turned on, CAN messages being converted by op amp 62 may be received back at transceiver 44 as is typical in CAN networks. If desired, a delay can be introduced to avoid signal interference. The delay can be implemented within op amp 74 or implemented in the turn-on of FET 71 compared to FET 66

(e.g., by choosing different FET devices or by adding an RC delay circuit at the gate terminal).

Figure 6:
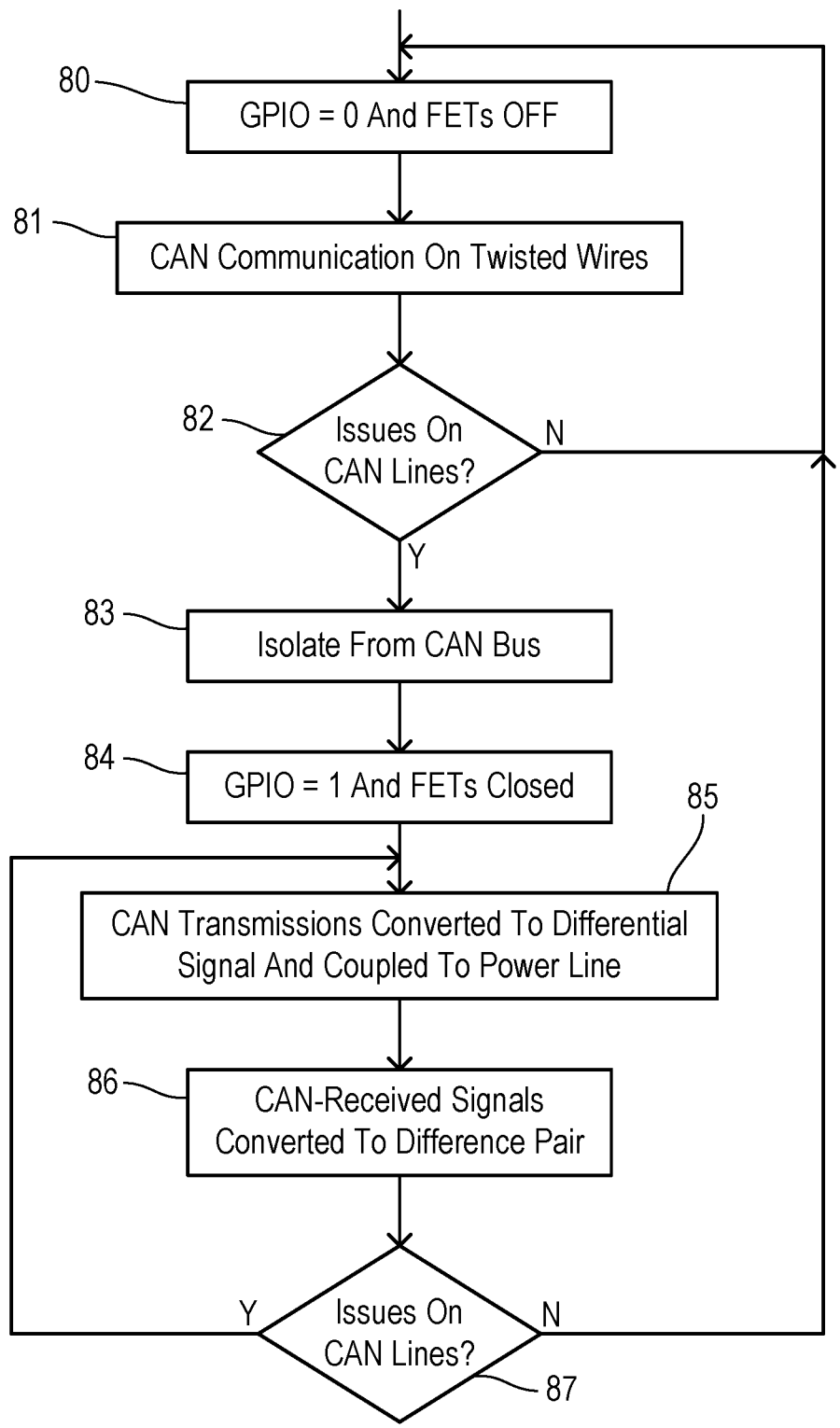
FIG. 6 is a flowchart showing one embodiment of a method according to the present invention.

One preferred method of the invention is shown in FIG. 6. During normal conditions without detection of any fault on the multiplex bus, a control signal on a general-purpose input output from the controller has a low or logical 0 value so that the FET switches are turned off and the bus isolator is inactive (i.e., conductive) in step 80. Therefore, CAN communication occurs over the twisted-wire multiplex bus in step 81. A check is performed in step 82 to determine whether any fault issues are detected on the CAN-H or the CAN-L lines. If not, then the control signal maintains the low value in step 80. Otherwise, it is determined in step 83 that the transceiver in the electronic module should be isolated from the CAN bus. In step 84, the control signal is switched to a high level (e.g., a logical 1) in step 84 to ensure that the FET switches are closed, and the bus isolator is opened (i.e., nonconductive). In this fault state, CAN messages are converted to differential signals and coupled to the power line in step 85. In step 86, received signals from the power line are converted to a difference pair. Thus, CAN messages flow to and from the electronic module despite the fault on the CAN bus. In step 87, a check is performed to determine whether the fault continues to exist on one or both of the CAN lines. If so then the fault-activated state continues in steps 85 and 86. Otherwise, a return is made to step 80 so that the FETs and the bus isolator return to their inactive states allowing normal CAN communication.

What is claimed is:

1. An electronic component in a vehicle comprising:
    a bus transceiver having a pair of transceiver output terminals adapted to be coupled to a multi-wire multiplex bus, wherein the multiplex bus transmits multiplex messages in the vehicle as complementary signals;
    a DC power input terminal adapted to be coupled to a power line supplying DC electrical power to a plurality of electronic modules in the vehicle;
    a subtractor generating a single-ended difference signal according to a voltage difference between the pair of transceiver output terminals;
    a balanced signal generator having a single input adapted to receive an alternating component of a voltage at the power input terminal, wherein the balanced signal generator has a pair of balanced outputs providing a differential signal to the transceiver output terminals according to a remote difference signal transmitted to the power line by one of the plurality of electronic modules;
    a first switch adapted to selectably couple the single-ended difference signal from the subtractor to the power input terminal when in a conductive state;
    a second switch adapted to selectably couple the single input of the balanced signal generator to the power input terminal when in a conductive state; and
    a controller configured to 1) detect a fault associated with the multiplex bus, 2) switch the first and second switches into the conductive states when the fault is detected, and 3) otherwise switch the first and second switches out of the conductive states;
    whereby when the fault is detected then the multiplex messages are transmitted on the power line with an unaltered message frame.

2. The electronic component of claim 1 further comprising:
    a bus isolator responsive to the controller and adapted to decouple the bus transceiver from the multiplex bus when the fault is detected.

3. The electronic component of claim 1 further comprising an AC coupling capacitor adapted to be connected between the first switch and the power line.

4. The electronic component of claim 1 wherein the second switch is connected between the first switch and the balanced signal generator, whereby the single input of the balanced signal generator is coupled to the power input terminal when both the first and second switches are in the conductive states.

5. The electronic component of claim 1 wherein the subtractor is comprised of a first operational amplifier having an inverting input and a noninverting input which are each coupled to respective one of the transceiver output terminals.

6. The electronic component of claim 1 wherein the balanced signal generator is comprised of a second operational amplifier, wherein the balanced outputs are both biased to a predetermined voltage.

7. The electronic component of claim 1 wherein the first switch is comprised of a first field-effect transistor (FET), wherein the second switch is comprised of a second FET, and wherein the first and second FETs have respective gate terminals coupled to receive a gate drive signal from the controller.

8. The electronic component of claim 7 wherein the controller is comprised of a microprocessor, and wherein the gate drive signal is comprised of a general purpose input/output of the microprocessor.

9. The electronic component of claim 8 further comprising a bus isolator responsive to the general purpose input/output of the controller for decoupling the bus transceiver from the multiplex bus when the fault is detected.

10. A vehicle comprising:
    a multi-wire multiplex bus routed within the vehicle for transmitting multiplex messages as complementary signals;
    a power line supplying DC electrical power in the vehicle; and
    a plurality of electronic components each comprising:
        a bus transceiver having a pair of transceiver output terminals coupled to the multi-wire multiplex bus;
        a DC power input terminal coupled to the power line;
        a subtractor generating a single-ended difference signal according to a voltage difference between the pair of transceiver output terminals;
        a balanced signal generator having a single input adapted to receive an alternating component of a voltage at the power input terminal, wherein the balanced signal generator has a pair of balanced outputs providing a differential signal to the transceiver output terminals according to a remote difference signal transmitted to the power line by another one of the plurality of electronic components;
        a first switch adapted to selectably couple the single-ended difference signal from the subtractor to the power input terminal when in a conductive state;
        a second switch adapted to selectably couple the single input of the balanced signal generator to the power input terminal when in a conductive state; and
        a controller configured to 1) detect a fault associated with the multiplex bus, 2) switch the first and second switches into the conductive states when the fault is detected, and 3) otherwise switch the first and second switches out of the conductive states;
    whereby when the fault is detected then the multiplex messages are transmitted on the power line with an unaltered message frame.

11. The vehicle of claim 10 wherein each electronic component further comprises:
   a bus isolator responsive to the respective controller and adapted to decouple the respective bus transceiver from the multiplex bus when the fault is detected.

12. The vehicle of claim 10 wherein each electronic component further comprises:
   an AC coupling capacitor adapted to be connected between the respective first switch and the power line.

13. The vehicle of claim 10 wherein the respective second switches are connected between the respective first switches and the respective balanced signal generators, whereby the single input of the respective balanced signal generator is coupled to the respective power input terminal when both the first and second switches are in the conductive states.

14. The vehicle of claim 10 wherein the respective subtractor is comprised of a respective first operational amplifier having an inverting input and a noninverting input which are each coupled to respective one of the respective transceiver output terminals.

15. The vehicle of claim 10 wherein the respective balanced signal generator is comprised of a respective second operational amplifier, wherein the respective balanced outputs are both biased to a predetermined voltage.

16. The vehicle of claim 10 wherein the respective first switch is comprised of a first field-effect transistor (FET), wherein the respective second switch is comprised of a second FET, and wherein the respective first and second FETs have respective gate terminals coupled to receive a respective gate drive signal from the respective controller.

17. The vehicle of claim 16 wherein the respective controller is comprised of a microprocessor, and wherein the respective gate drive signal is comprised of a general purpose input/output of the respective microprocessor.

18. The vehicle of claim 17 wherein each electronic component further comprises a respective bus isolator responsive to the general purpose input/output of the respective controller for decoupling the respective bus transceiver from the multiplex bus when the fault is detected.

* * * * *